US012753651B2

(12) United States Patent
Stoffelshaus

(10) Patent No.: US 12,753,651 B2
(45) Date of Patent: Oct. 6, 2026

(54) MULTI-PANE INSULATED GLASS AND METHOD FOR PRODUCING SAME

(71) Applicant: Framy GmbH, Fuldabrück (DE)

(72) Inventor: Ingo Stoffelshaus, Kassel (DE)

(73) Assignee: Framy GmbH, Fuldabrück (DE)

( * ) Notice: Subject to any disclaimer, the term of this patent is extended or adjusted under 35 U.S.C. 154(b) by 78 days.

(21) Appl. No.: 18/318,922

(22) Filed: May 17, 2023

(65) Prior Publication Data

US 2023/0383591 A1 Nov. 30, 2023

Related U.S. Application Data

(63) Continuation of application No. PCT/EP2021/058876, filed on Apr. 6, 2021.

(30) Foreign Application Priority Data

Nov. 18, 2020 (DE) ..................... 10 2020 130 491.9

(51) Int. Cl.
*E06B 3/673* (2006.01)
*E06B 3/663* (2006.01)

(52) U.S. Cl.
CPC ...... *E06B 3/67347* (2013.01); *E06B 3/66319* (2013.01); *E06B 3/66342* (2013.01)

(58) Field of Classification Search
CPC ............. E06B 3/66342; E06B 3/66352; E06B 3/66319; E06B 3/6733; E06B 3/67347
See application file for complete search history.

(56) References Cited

U.S. PATENT DOCUMENTS 3,261,139 A * 7/1966 Bond .................. E06B 3/66352 52/204.593
5,088,258 A * 2/1992 Schield ............... E06B 3/66342 52/204.593
5,512,341 A * 4/1996 Newby ............... E06B 3/66314 428/35.8
8,372,909 B2 2/2013 Becker et al.
(Continued)

FOREIGN PATENT DOCUMENTS

DE 29515924 U1 * 2/1997 ......... E06B 3/66314
DE 10023541 A1 11/2001
(Continued)

OTHER PUBLICATIONS

Machine translation of DE 10 2011 011 549 (Year: 2012).*
Machine translation of DE102011011549 (Year: 2025).*
English Translation of EP-3080377-B1 (Year: 2025).*

*Primary Examiner* — Christine T Cajilig
(74) *Attorney, Agent, or Firm* — Rankin, Hill & Clark LLP

(57) ABSTRACT

The invention relates to a multi-pane insulated glass (10), including at least two panes (15, 16), between which an edge seal (13) is inserted. The edge seal (13) has a peripheral spacer (14). The edge seal (13) separates a pane intermediate space (11) from a pane exterior space (12). A primary sealant (17) is provided between the peripheral spacer (14) and the panes (15, 16). The primary sealant seals the pane intermediate space (11) from the pane exterior space (12). An elastic seal (19) is provided which, seen from the pane intermediate space (11), is located in front of the primary sealant (17). The elastic seal provides sealing between the spacer (14) and a pane (15, 16).

11 Claims, 2 Drawing Sheets

(56) References Cited

U.S. PATENT DOCUMENTS

| | | | | |
|---|---|---|---|---|
| 2003/0148049 | A1* | 8/2003 | Bayer | E06B 3/66314 428/34 |
| 2005/0167028 | A1* | 8/2005 | Reichert | E06B 3/66352 156/109 |
| 2011/0027606 | A1* | 2/2011 | Lenhardt | E06B 3/66314 428/34 |
| 2016/0290033 | A1 | 10/2016 | Messere | |

FOREIGN PATENT DOCUMENTS

| | | | | |
|---|---|---|---|---|
| DE | 102004027527 | A1 | 8/2005 | |
| DE | 102011011549 | A1 * | 8/2012 | E06B 3/66342 |
| EP | 2420536 | A1 | 2/2012 | |
| EP | 3080377 | B1 * | 9/2023 | E06B 3/66342 |
| WO | 2015086457 | A2 | 6/2015 | |

* cited by examiner

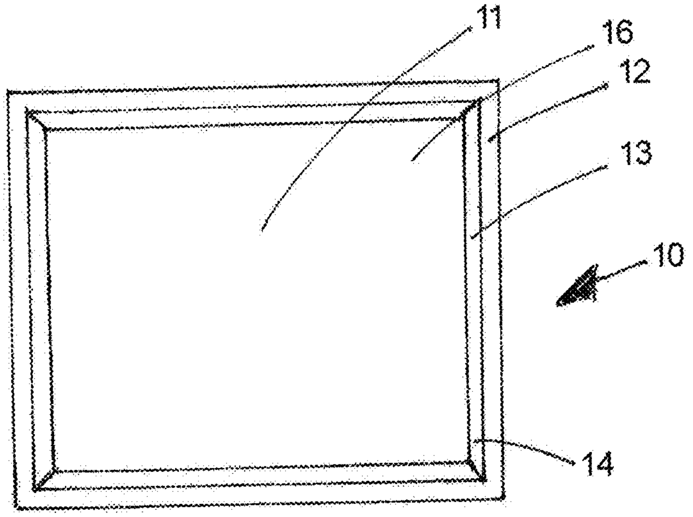
FIG. 1
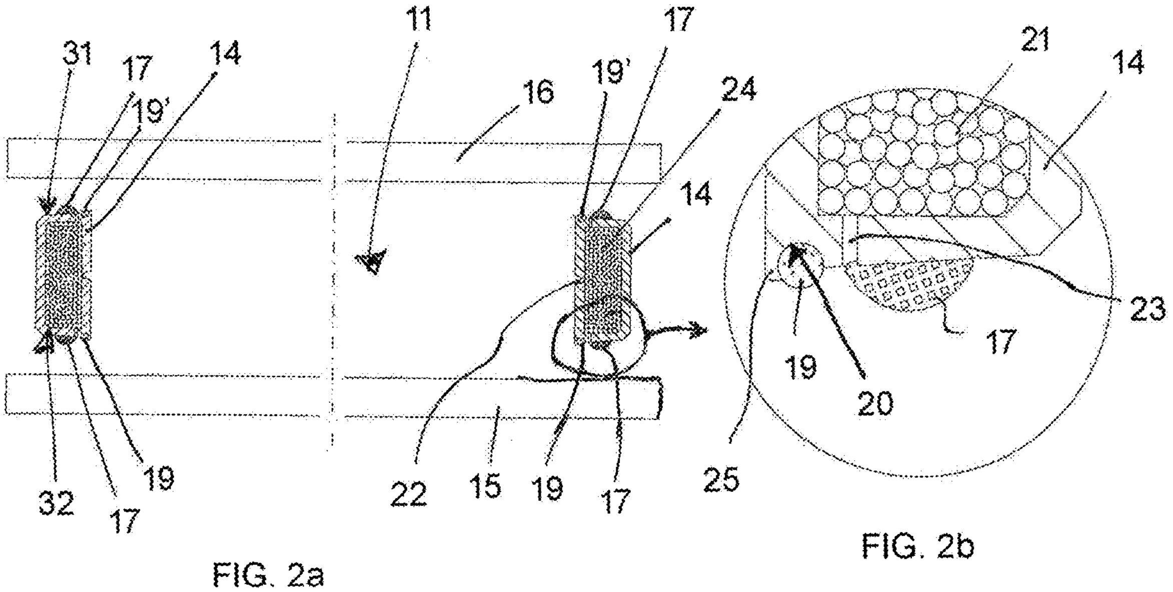
FIG. 2a
FIG. 2b

MULTI-PANE INSULATED GLASS AND METHOD FOR PRODUCING SAME

CROSS-REFERENCE TO RELATED APPLICATIONS

This application is a by-pass continuation of International Application No. PCT/EP2021/058876, filed Apr. 6, 2021, and claims priority to German Patent Application No. 10 2020 130 491.9, filed Nov. 18, 2020.

BACKGROUND OF INVENTION

Multi-pane insulated glass normally consist of two or more float glass panes, occasionally also rolled glass or other flat glass or glass substitute products, that are glued by a spacer, generally of metal, plastic, or a composite material, to a primary seal applied to the contact surfaces. The spacer maintains a defined distance to the glass edge which forms the space for the secondary seal which is to ensure a long-lasting, gas-diffusion-tight seal of the pane intermediate space. To achieve a higher thermal insulation value, the intermediate space is normally filled with an inert gas mixture.

Moreover, at least one of the panes normally has coating on the side facing the pane intermediate space. Within the context of the invention, the term "pane" also includes a pane on which in particular a coating is provided on the side facing the pane intermediate space.

The problem of the primary seal entering the pane intermediate space from climate loads and thermal stress is currently overcome by more precise positioning and more specific pressure as well as greater material compatibility of the components or special shapes of the metal spacer.

BRIEF SUMMARY OF THE INVENTION

The object of the present invention is to present both a multi-pane insulated glass as well as a method for producing a multi-pane insulated glass, as well as the use of an element by means of which it is reliably possible to prevent a primary sealant from being able to pass into or enter the pane intermediate space.

This object is achieved by the use of an elastic seal in a multi-pane insulated glass, wherein the multi-pane insulated glass has at least two panes and an edge seal comprising a peripheral spacer which is arranged between the two panes and separates a pane intermediate space from a pane exterior space, wherein a primary sealant is provided between the spacer and panes, wherein the elastic seal is a barrier to the spread of the primary sealant into the pane intermediate space.

Within the context of the invention, the elastic seal can also be termed a sealing lip, barrier seal or barrier lip. Providing the elastic seal efficiently keeps the primary seal from being able to expand into the pane intermediate space. Since the elastic seal represents a barrier for the spreading of the primary sealant into the pane intermediate space, the primary sealant will expand in another direction.

The spacer is designed to be peripheral, in particular such that it follows the contour of the pane edge or runs substantially parallel to the pane edge, and preferably at a distance of, for example, 5 mm to 20 mm.

Preferably, the spacer has a compensation area for a primary sealant flowing in the direction of the elastic seal.

Preferably, the primary sealant is a plastic sealant, in particular polyisobutylene.

Preferably, the elastic seal is applied to the spacer in a flowing state, and the spacer is placed between the panes after the seal cures. Accordingly for example, a still flowing silicone can be applied to the spacer such that it is also applied peripherally around the spacer and is first cured until the flowable state is over such that a corresponding pressure is generated by connecting the multi-pane insulated glass only when the seal is in the state in which it is elastic.

Alternatively to this, the elastic seal can preferably be connected to the spacer as a cord, in particular a round cord or a cord with a square cross-section. Accordingly for example, a peripheral cord, i.e. a continuous cord, can be applied to the spacer peripherally around the spacer on a side that is provided for connecting to a pane, for example clamped or glued in a groove. On the opposite side of the spacer, an elastic seal is also applied or clamped in the form of a cord to allow a quicker assembly of the multi-pane insulated glass. Alternatively, an elastic cord can also be connected at its ends to produce overall a peripheral continuous cord. To also allow a connection with the opposite pane, an elastic seal is also applied there to the spacer.

Preferably the elastic seal is silicone, polyurethane or polysulfide. Alternatively, the elastic seal can also be a vulcanizate of natural rubber or silicone rubber.

Preferably, a secondary sealant is provided on the outside around the spacer and between the panes. The secondary sealant is therefore introduced into the pane exterior space.

The object is furthermore achieved by a multi-pane insulated glass comprising at least two panes between which an edge seal is introduced, wherein the edge seal has a peripheral spacer, wherein the edge seal separates a pane intermediate space from a pane exterior space, wherein a primary sealant is provided between the peripheral spacer and the panes that seals the pane intermediate space from the pane exterior space, and is developed in that an elastic seal is provided which, viewed from the pane intermediate space, is arranged in front of the primary sealant and provides a seal between the spacer and a pane.

Preferably, the spacer provides a compensation area for a primary sealant flowing in the direction of the elastic seal.

Preferably, the compensation space comprises a groove and/or at least one through-hole into a cavity of the spacer.

The groove itself can already have a corresponding volume into which the primary sealant can enter to provide compensation. Moreover, a through-hole can also be provided through which the primary sealant can pass into a cavity of the spacer. Conventional spacers have, for example, a profile made of metal or another material with a cavity in which a desiccant is introduced. Moreover, the profile or the spacer is normally perforated facing the pane intermediate space so that the cavity and the pane intermediate space are in communication with each other. The desiccant such as for example silica gel then keeps the volume of the pane intermediate space dry.

According to a preferred embodiment of the invention, this cavity also serves to accommodate primary sealant if the primary sealant expands, for example from an increase in temperature.

Preferably, a secondary sealant is provided in the pane exterior space peripherally surrounding the spacer. The secondary sealant is introduced on the outside around the spacer into a groove defined by the panes and the spacer. The secondary sealant serves to further seal the multi-pane insulated glass. Moreover, the secondary sealant also serves to preferably stabilize the multi-pane insulated glass.

Preferably, the primary sealant is polyisobutylene, also termed isobutylene or butyl for short.

Preferably, the elastic seal is silicone, polyurethane, polysulfide or a vulcanizate of natural rubber or silicone rubber.

Preferably, the elastic seal is designed to be applied to the spacer when in a flowing state and to be connected with the panes after the elastic seal cures.

Alternatively, the elastic seal is preferably designed to be connected as a cord to the spacer (14).

If a groove is provided in the spacer for receiving the elastic seal, it is preferably ensured that the elastic seal in its position does not shift out of position even if the primary sealant expands in such a way that it presses against the elastic seal.

The elastic seal is preferably an extrudate.

The secondary sealant comprises or is in particular polyurethane, silicone, or a polysulfide.

The object is furthermore achieved by a method for producing a multi-pane insulated glass having the following method steps:

- providing a peripheral spacer,
- applying one elastic seal to each of two opposite sides of the spacer,
- applying a plastic primary sealant next to the elastic seal on each of the opposite sides of the spacer, wherein the plastic primary sealant is applied further to the outside in comparison to the elastic seal,
- joining the spacer provided with the plastic primary sealant and the elastic seal to one pane each on the two opposing sides of the spacer, and
- filling a pane exterior space of the panes with a secondary sealant.

Within the scope of the invention, the pane exterior space can also be termed an external joint between the two panes and the spacer.

Preferably, a pane intermediate space that is enclosed and defined by the two panes and the spacer is filled with an inert gas or a mixture of inert gases.

Preferably, the elastic seal represents a limit to the spreading of the primary sealant into the pane intermediate space.

One embodiment provides an insulated glass pane having at least two panes, for example glass panes, and between them in the edge region, a spacer profile which may be referred to in the scope of the invention as a spacer, having at least two permanently elastic, non-permanently plastic seals on the spacer, or partially introduced into the spacer. At least one elastic seal is arranged on the side of the spacer which borders a pane.

The elastic seals fulfill the task of preventing the primary seal used in the edge seal of the insulated glazing unit or the multi-pane insulated glass, which is to ensure that the pane intermediate space is gas-tight, from leaving its provided effective area or the application site. To prevent the primary seal from entering into the pane intermediate space, an embodiment is proposed of providing a three-level seal assembly consisting of an elastic seal, which may also be referred to as a primary seal barrier or primary seal, a primary seal and secondary seal instead of a two-level seal assembly consisting of a primary seal and secondary seal.

Normally, an insulated glazing unit or a multi-pane insulated glass comprises at least two panes with surfaces arranged parallel to each other that are kept at a distance with the aid of a spacer of metal, plastic, or a composite material. The spacers are normally mostly rectangular hollow bodies which are filled with a desiccant to avoid condensate in the pane intermediate space and have a perforation on the side facing the pane intermediate space. The spacers are assembled into closed frames by bending or plugging them together with plastic or metal connectors in the corners, and their shape follows the geometry of the glass panes or panes with a certain offset towards the center of the pane.

A primary seal, generally polyisobutylene that is liquefied by being heated, is sprayed onto the sides of the spacer facing the glass surface. The spacers prepared in this way are then pressed together with the glass panes. By providing a predeterminable amount of primary seal and a predeterminable pressure when the spacer is brought together with the panes, a uniform seal arises that ensures gas tightness and holds the multi-pane insulating glass together for the time being. To fix this structure permanently and seal it for the long term, the cavity created by the outward offset of the frame is filled with the secondary seal and therefore bonded by at least three flanks.

The pane intermediate space arising during assembly is filled with a gas mixture, frequently also with an inert gas, to improve the thermal insulating effect. For the same purpose, a coating is normally used on at least one of the glass surface or surfaces or pane surface or surfaces facing the pane intermediate space.

When the multi-pane insulated glass is in an installed state, the glass filling expands by being heated or by solar radiation during the day, and at night, it contracts. This results in a pumping movement that exerts pressure and mechanical stress on the primary seal. Because of this pressure, the permanently plastic polyisobutylene which is normally used begins to migrate into the pane intermediate space. In addition to the aesthetic problem, this can cause the sealing effect to prematurely abate in serious cases. By using another sealing layer in the form of an elastic seal before the primary seal viewed from the pane intermediate space, the migration of the primary seal into the pane intermediate space is prevented. In particular, movement in the edge seal is compensated by the flexibility of the elastic seal. The elastic seal is preferably flexible enough to be partially compressed while pressing the multi-pane insulating glass and to expand again during the thermally-induced expansion of the gas filling in the pane intermediate space and the resulting pumping movement of the multi-pane insulated glass.

The elastic seal is preferably not thermoplastic. If a thermoplastic is used, there should be a temperature resistance of the thermoplastic at which the softening point is greater than or equal to 120° C. or greater than or equal to 130° C. In addition, it is preferable to use a material as an elastic seal that has substantially no or only a slight tendency to outgassing under a temperature load.

Preferably, the material of the elastic seal is extruded to form a sealing cord and is fixed to the spacer with a form fit by gluing or direct application. Preferably, a groove, a recess and/or a bar is provided for mechanically securing the elastic seal. Within the context of the invention, a groove is also understood to be a recess. Alternatively or in addition to a groove, a bar can also be used against which the elastic seal can be supported.

Preferably, the expansion of the primary seal is not suppressed but rather specified. For this purpose, a compensation space such as a cavity, a bead, a recess or a compensation chamber or compensation chambers designed in a different way is provided which are or will be drilled, milled, extruded, blasted, lasered or punched into the spacer. Provision may also be made to form a diaphragm that can expand into a compensation space.

It is furthermore provided that a maximum volume of the primary seal resulting from heating ensures that the elastic seal is not mechanically overloaded or detached by migration of a part of the primary seal into a compensation space. Preferably, a primary sealant or a primary seal is provided that has high cohesion forces so that the primary seal is prevented from tearing off. This ensures that no primary sealant or primary seal material enters the pane intermediate space, and the elastic seal is therefore not overstressed or damaged.

Through the invention, in particular the compensation space, an excess amount of applied primary sealant does not cause the multi-pane insulated glass to be damaged since the excess amount of applied primary sealant can flow off into the compensation space without causing damage.

Further features of the invention will become evident from the description of embodiments, together with the claims and the appended drawings. Embodiments can fulfill individual features or a combination of several features.

Within the context of the invention, features which are labeled with "in particular" or "preferably" are to be understood to be optional features.

BRIEF DESCRIPTION OF THE DRAWINGS

The invention is described below, without restricting the general idea of the invention, based on exemplary embodiments in reference to the drawings, whereby we expressly refer to the drawings with regard to the disclosure of all details that are not explained in greater detail in the text. In the drawings:

FIG. 1 shows a schematic plan view of a multi-pane insulated glass;

FIG. 2*a* shows a schematic cross-sectional view of a multi-pane insulated glass shortly before being assembled;

FIG. 2*b* shows a schematic detail view from FIG. 2*a;*

In the drawings, the same or similar elements and/or parts are, in each case, provided with the same reference numerals such that they are not introduced again in each case.

DETAILED DESCRIPTION OF THE INVENTION

Figure 3A:
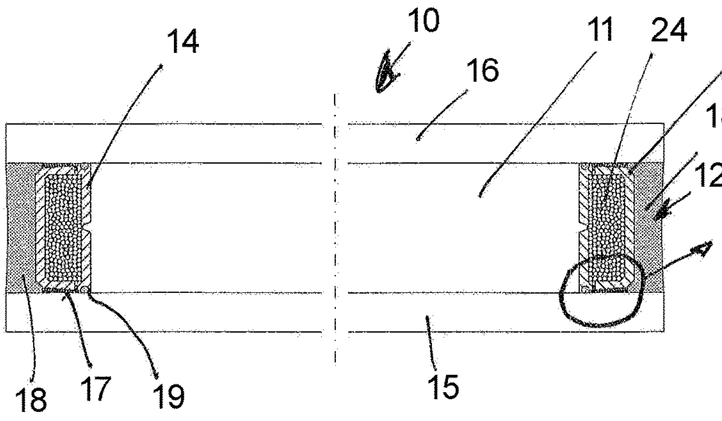
FIG. 3*a* shows a schematic cross-sectional view of a multi-pane insulated glass in an assembled state.

FIG. 1 shows a schematic plan view of a multi-pane insulated glass 10. An edge seal 13 is provided that comprises a spacer 14 which is provided with a small distance from the edge of the panes and preferably peripherally replicates the contour of the panes. The edge seal 13 connects a top pane 16 and a bottom pane 15. For connecting, a primary seal 17, not shown in FIG. 1, is provided that is peripherally applied to the spacer and connects or glues the spacer 14 to the pane 16 at the top. Correspondingly, a primary sealant 17 is also applied to the spacer 14 underneath it and connects the spacer 24 to the pane 15 underneath.

The frame seal 13 may also include a secondary sealant introduced into an exterior space 12 or groove formed by the two panes and spacer 14, which is also not shown in FIG. 1 for clarity. The two panes 16 and 15, together with the spacer 14, define a pane intermediate space 11. A gas, for example a mixture of inert gases, can be introduced into the pane intermediate space 11 to improve the thermal insulation.

FIG. 2*a* shows a schematic sectional view of the multi-pane insulated glass before assembly. A primary sealant 17 is applied to the spacer 14 at the top and bottom of the sides of the spacer 14 which is shown in section on the right side and on the left side in FIG. 2*a*. Toward the inner space, i.e. in the direction toward the opposite spacer 14, an elastic seal 19/19' is provided on the respective spacer 14. The elastic seal 19' and the elastic seal 19 are each arranged peripherally on the spacer 14. The spacer 14 has a cavity 24 in which a desiccant 21 is introduced. A perforation 22 is provided to the pane intermediate space 11 in the spacer 14 to allow a gas connection of the desiccant 21 to the pane intermediate space 11.

FIG. 2*b* schematically shows a detail enlargement from FIG. 2*a*. It can be seen therein how the primary seal 17 is applied to one side of the spacer 14. The elastic seal 19 is introduced into a groove 20. A bar 25 is also shown therein that can be provided in addition or alternatively to the groove 20. The groove 20 and/or the bar 25 adjoins the elastic seal 19. Furthermore, a channel 23 is provided that enables a connection from the outside of the spacer 14 to the inside in the cavity 24. Both the cavity 24 as well as the channel 23 serve as a compensation space for the primary sealant 17.

FIG. 3*a* shows a schematic detail view of a multi-pane insulated glass 10 assembled as disclosed herein. In addition to the primary sealant 17 and the elastic seal 19, a secondary sealant 18 is introduced externally around the spacer 14 into the pane exterior space 12 or a groove 20 formed externally by the panes 15 and 16 and the spacer 14.

Figure 3B:
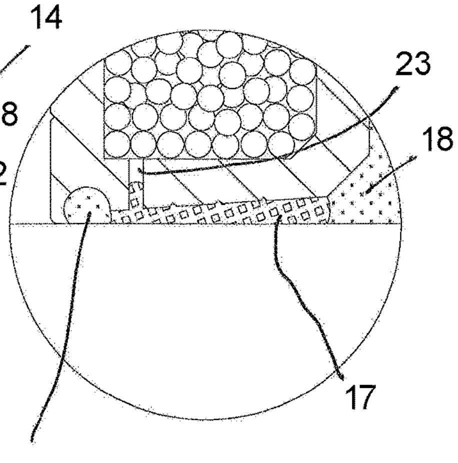
FIG. 3*b* shows a schematic detail view from FIG. 3*a;*

FIG. 3*b* shows another schematic detail enlargement from FIG. 3*a*. It can be seen therein that a part of the primary sealant 17 has entered the channel 23.

Figure 4A:
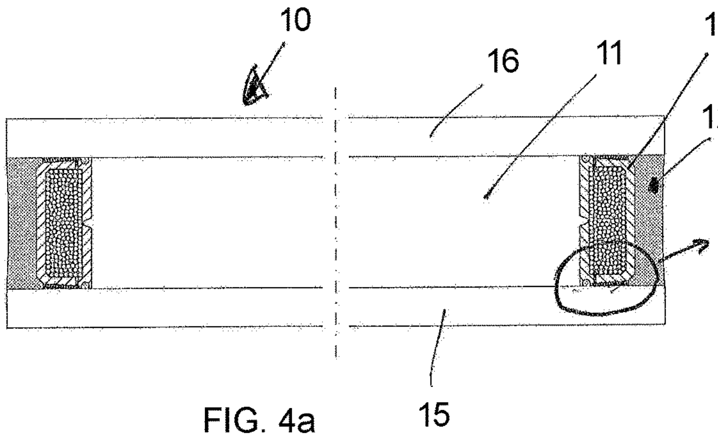
FIG. 4*a* shows another schematic cross-sectional view of a multi-pane insulated glass.
Figure 4B:
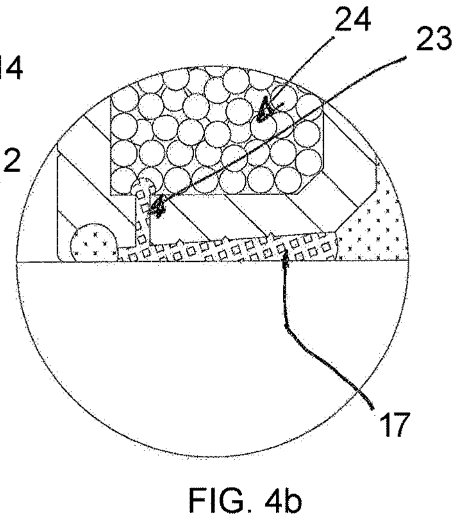
FIG. 4*b* shows a schematic detail view from FIG. 4*a*.

FIG. 4*a* substantially shows a corresponding schematic cross-sectional view of the multi-pane insulated glass 10 in which, as in FIG. 4*b*, which schematically shows an enlarged detail view, it is easier to see that slightly more primary sealant 17 has entered the channel 23 and has even passed through the channel 23 and entered the cavity 24.

All of the indicated features, including those which are to be inferred from the drawings alone, as well as individual features which are disclosed in combination with other features, form part of the invention both alone and in combination. Embodiments can be fulfilled by individual features or a combination of several features.

REFERENCE CHARACTERS APPEARING IN THE DRAWING FIGURES

The following reference characters appear in the accompanying drawing figures:

10 Multi-pane insulated glass
11 Pane intermediate space
12 Pane exterior space
13 Edge seal
14 Spacer
15 Pane
16 Pane
17 Primary sealant
18 Secondary sealant
19 Elastic seal
20 Groove
21 Desiccant
22 Perforation
23 Channel
24 Cavity
25 Bar
31 Side
32 Side

What is claimed is:

1. A multi-pane insulated glass comprising at least two panes between which an edge seal is introduced, wherein the edge seal includes a peripheral spacer provided with a cavity, wherein the edge seal separates a pane intermediate space from a pane exterior space, wherein a primary sealant is provided between the spacer and the panes such that the primary sealant seals the pane intermediate space from the pane exterior space, wherein an elastic seal is provided which, when viewed from the pane intermediate space toward the pane exterior space, is arranged in front of the primary sealant and provides a seal between the spacer and at least one of the at least two panes, wherein the spacer comprises two compensation spaces, designed as through holes into the cavity of the spacer, arranged on opposing side surfaces of the spacer.

2. The multi-pane insulated glass according to claim 1, wherein the compensation spaces provided in the spacer further comprises grooves.

3. The multi-pane insulated glass according to claim 1, further comprising a secondary sealant, said secondary sealant being provided in the pane exterior space peripherally surrounding the spacer.

4. The multi-pane insulated glass according to claim 1, wherein the primary sealant is polyisobutylene.

5. The multi-pane insulated glass according to claim 1, wherein the elastic seal is silicone, polyurethane, polysulfide, a vulcanizate of natural rubber or silicone rubber.

6. The multi-pane insulated glass according to claim 1, wherein the elastic seal is configured to be applied to the spacer when in a flowing state and to be connected to the panes after the elastic seal cures.

7. The multi-pane insulated glass according to claim 1, wherein the elastic seal is configured to be connected to the spacer as a cord.

8. The multi-pane insulated glass according to claim 1, wherein a groove is provided in the spacer to receive the elastic seal.

9. The multi-pane insulated glass according to claim 1, wherein the elastic seal is an extrudate.

10. The multi-pane insulated glass according to claim 3, wherein the secondary sealant is introduced externally around the spacer in a groove defined by the panes and the spacer.

11. The multi-pane insulated glass according to claim 1, wherein the cavity provided in the spacer contains a desiccant.

* * * * *